Patented July 30, 1935

2,009,657

UNITED STATES PATENT OFFICE 2,009,657

ESTERS OF POLYMERIC CARBOHYDRATES

Max Hagedorn and Berthold Reyle, Dessau in Anhalt, Germany, assignors to I. G. Farbenindustrie Aktiengesellschaft, Frankfort - on- the-Main, Germany No Drawing. Application May 19, 1931, Serial No. 538,626. In Germany June 4, 1930

16 Claims. (Cl. 260—101)

Our present invention relates to a new process of manufacturing esters, mixed esters or ether-esters of polymeric carbohydrates and more particularly to such a process wherein an organic or inorganic acid halide is used as an esterifying agent.

Other objects of our invention are the new esters and ether-esters of polymerized carbohydrates obtainable by our new process.

Processes are known for preparing mixed esters and ether-esters of the polymeric carbohydrates by causing an acid halide to act upon a carbohydrate derivative still containing reactive hydroxyl groups and binding the hydrogen halide formed during the reaction by means of tertiary bases, inorganic carbonates or the like added to the esterification mixture. It has also been proposed to esterify in the absence of bodies binding the hydrogen halide evolved during the reaction. This process was, however, not successful in practice, since the free hydrogen halide has a degrading action upon the carbohydrate derivative produced and, therefore, detrimentally influences its physical and chemical properties.

According to our invention, the polymeric carbohydrate or its derivatives are esterified with organic or inorganic acid halides in the absence of agents which bind hydrogen halide and without detrimentally influencing the resultant carbohydrate derivatives produced, by conducting the operation with exclusion of water and protecting the esterification product from the action of the hydrogen halide which is simultaneously formed. For instance, the hydrogen halide may be continuously mechanically eliminated by working under a reduced pressure, especially in a vacuum or by passing a current of a dry inert gas, for instance, nitrogen or carbon dioxide, through the reaction vessel during the esterification process. The reaction can be carried out in various forms of apparatus, for instance, in stirring vessels, rotating drums, kneading devices or reaction towers, insofar as they are adapted for working in a vacuum or in an atmosphere of inert gas. Temperature, pressure, duration of the reaction and the like, are adapted in known manner to the reaction to be carried out in each particular case. These conditions must be regulated with regards to the acid halide used, whether it is caused to react in a gaseous or liquid form and whether an indifferent diluent is used.

When working in a vacuum or an indifferent gas atmosphere are to be avoided, the carbohydrate derivative can be protected from the action of the hydrogen halide also by the use of an indifferent diluent, which dissolves only the acid halide, but does not dissolve the polymeric carbohydrate or the derivative produced by the esterification. In an undissolved state the carbohydrate derivative is largely protected from the action of hydrogen halide. If desired the operation may be conducted both in the presence of a diluent of this kind and in a vacuum or an inert gas.

The process may be carried out with the halides of the lower or higher substituted or non-substituted aliphatic or alicyclic carboxylic acids such as, for instance, acetyl chloride, butyl chloride, propionyl chloride, stearic acid chloride, palmitic acid chloride, oleic acid chloride, naphthenic acid chloride, benzoyl chloride, and so on. As an inorganic acid chloride we may use, for instance, carbonyl chloride, thionyl chloride, sulfuryl chloride, chromyl chloride, titanium tetrachloride, the chlorides of the acids derived from phosphorus, arsenic, antimony and so on.

When reacting simultaneously with an inorganic and an organic acid chloride on the polymerized carbohydrate, inorganic-organic mixed esters of the carbohydrates are obtained. In this case we prefer to start the reaction with the free organic acid instead of its halide, while applying an excess of the inorganic acid chloride, in order to convert the organic acid intermediary into the corresponding chloride. Thus, for instance, a free aliphatic acid may be applied together with the chlorides of phosphoric acid or sulfuric acid.

The process described above, likewise, may be carried out when manufacturing the simple esters of polymeric carbohydrates. In this case a single acid halide is used for esterifying the polymerized carbohydrate. In order to initiate the reaction, an amount of a heterocyclic tertiary amine is added which is, however, only a small fraction of that theoretically necessary to bind the hydrogen halide which is evolved in the double decomposition occurring between the acid halide and the carbohydrate. The bulk of hydrogen halide is removed as described above by carrying out the reaction in the absence of water while withdrawing the hydrogen halide formed.

All of the polymeric carbohydrates are appropriate as starting materials, especially cellulose, starch, dextrine, agar-agar, and the aliphatic, araliphatic and aromatic ethers and hydroxy-ethers, esters, ether-esters and mixed esters thereof, which still possess reactive hydroxyl groups.

The mixed esters and ether-esters of the polymeric carbohydrates made according to this invention have the same properties as the corresponding carbohydrate derivatives prepared by means of acid halides in the presence of agents which bind hydrogen halide and they can likewise be utilized for a number of technical purposes; they may particularly be used in known manner for preparing lacquers, films, artificial threads, electric insulating materials, impregnating solutions, safety glass, artificial leather, adhesive substances and shaped bodies of any kind.

The following examples illustrate the invention:—

*Example 1.*—100 grams of hydroxypropyl cellulose are suspended in 490 grams of butyric acid chloride and the suspension is slowly heated in a vacuum under the action of a heating bath of about 60° C.–65° C. The acid chloride reacts with the hydroxypropyl cellulose, whereas hydrochloric acid and an excess of butyric acid chloride are distilled and collected in a receiver. The pressure is regulated so that the distillation endures 3–5 hours altogether. The residue is a hydroxypropyl-cellulose-butyrate which, by washing with water, is freed from small quantities of butyric acid, butyric acid chloride and hydrochloric acid still adhering thereto, and then dried. The hydroxyether-ester of cellulose thus obtained dissolves in the cold in chlorinated aliphatic hydrocarbons, acetone, ethyl acetate and other esters, and in the heat in methanol and benzene.

*Example 2.*—10 grams of hydrolized cellulose acetate containing 54% of bound acetic acid are heated for 2 hours in a bath of 50° C.–60° C. with 10 ccm. of cocoa-fatty acid chloride and subsequently for 6 hours in a bath of 70° C. under a reduced pressure (absolute pressure of 15–30 mm.). A cellulose mixed ester is formed which contains 18–20% of chemically bound cocoa-fatty acid and can be purified by extraction with methanol. The mixed ester has the same solubility as the parent material, its solubility in aromatic hydrocarbons is even better.

*Example 3.*—300 grams of acetyl chloride are dissolved in 2 liters of petroleum ether. 100 grams of fibrous hydroxyethyl cellulose are introduced into this solution and the mixture is allowed to stand for several days at room temperature. After that time the externally unaltered fibrous material is acetylated. The hydroxyethyl cellulose acetate formed dissolves in acetone and chlorinated hydrocarbons.

*Example 4.*—100 grams of acetate silk (containing 54% of acetic acid) are suspended in a porcelain vessel of a content of 20 liters, ignited pieces of pumice are placed on the bottom of the vessel and 75 ccm. of butyryl chloride are poured on the pumice. Then the vessel is evacuated for about 5 hours to a vacuum corresponding to about 100 mm. mercury while sucking off the vaporous hydrogen chloride. Then the silk is washed or steamed. By this further esterification the weight of the silk is raised by about 8–10%.

*Example 5.*—75 grams of acetone-soluble cellulose acetate containing 56% of bound acetic acid are dried for 12 hours at a temperature of 50–60° C. in a dry current of air and successively for about 1 hour at 50° C. in a vacuum at a pressure of about 15–20 mm. mercury. The dried material is treated in a closed vessel at a temperature of 20–25° C. and at a pressure corresponding on the average to 700 mm. mercury with vapors of carbonyl chloride evolved from 90 ccm. of a solution in toluene of 15% strength. The gaseous hydrogen chloride and the carbonyl chloride not consumed during the reaction, is withdrawn by the water-jet vacuum pump, whereat, however, care is taken that no water vapors may enter the reaction vessel. When the whole quantity of carbonyl chloride is consumed, the reaction mixture is freed from the adhering reagents by a current of dry air and the cellulose acetate carbonate is further purified with distilled water and finally dried. It is distinguished from the starting material by the capability of absorbing a greater amount of water and by a better capacity of being dyed.

The further esterification of the cellulose acetate with the aid of carbonyl chloride can be likewise carried out at ordinary pressure under the same conditions. The qualities of the reaction product are not essentially changed by this modified treatment.

*Example 6.*—75 grams of cellulose acetate containing 56% of bound acetic acid are dried in the manner described in Example 5 and are treated at about 20–25° C. under a pressure of 12 mm. mercury with the vapors of 3 ccm. of chromyl chloride. The chromyl chloride preferably is distributed upon calcined pumice contained in a round-bottomed flask. This flask is connected with the vessel containing the cellulose acetate by an air-tight connecting tube. With the aid of a water-jet vacuum pump a diminished pressure is produced in the apparatus; the water running through the pump absorbs the hydrogen chloride evolved during the reaction and the unconsumed vapors of chromyl chloride. The reaction is continued for 5 hours, whereat the temperature of the bath in which the flask containing the acid chloride is placed, is slowly raised from 30–60° C. The reaction product being a cellulose acetate chromate, is washed with water and dried. It is soluble in acetone; from this solution a transparent, nearly colorless film may be produced.

*Example 7.*—400 grams of a dried cellulose acetate as mentioned in Example 5, are mixed in a closed flask with 130 ccm. of dry butyric acid and the mixture is introduced while excluding air into a rotatable brass tube. While rotating the latter, 125 ccm. of gaseous thionyl chloride are reacted upon the mixture at a temperature of 20° C. and under a pressure of 12 mm. mercury. The water running through the water-jet vacuum pump used for producing the diminished pressure absorbs the evolved vapors of hydrochloric acid and sulfurous acid and likewise the vapors of the thionyl chloride added in excess. A cellulose acetate butyrate sulfite is obtained which has lost its solubility in acetone, but is only swollen by the latter. By boiling it for some time with sulfuric acid of 1% strength, the content of the ester on chemically bound sulfur is diminished, whereby the product becomes again soluble in acetone.

*Example 8.*—10 grams of the dried cellulose acetate mentioned in Example 5, are treated in the apparatus described in the foregoing examples with 10 ccm. of silicon tetrachloride. The reaction is carried out for 1 hour at room temperature at a pressure of 12 mm. mercury, the unconsumed amount of silicon tetrachloride is removed with the aid of a current of dried air and the reacting product is extracted with methanol. It is insoluble in acetone and contains 6.4% of chemically bound $SiO_2$.

*Example 9.*—100 grams of bleached and dried linters are heated together with 425 ccm. of cocoa-fatty acid chloride in the presence of 60 ccm. of technical pyridine bases for 5 hours to a temperature of 95° C. at a pressure of 30–600 mm. mercury. The cocoa-fatty acid ester of cellulose is separated by extracting the reaction mixture with methanol; it is swellable in chloroform and benzene by a depolymerzation carried out in the known manner. It may be transformed into a soluble product.

*Example 10.*—10 grams of wheat-starch dried at 70° C., are suspended in a mixture of 50 ccm. of stearic acid chloride and 6 ccm. of technical picoline bases and heated for 1¾ hours to about 95–105° C. while passing a current of dried air through the mixture. Then the reaction mixture is allowed to cool while continuing to interduce the current of air, and the starch stearate formed is separated and purified by continuously kneading and boiling it with methanol. The reaction product is soluble in ether, ethyl acetate, chlorided aliphatic hydrocarbons and aromatic hydrocarbons.

It is obvious that our invention is not limited to the foregoing examples or to the specific details given therein. Other halides of organic or inorganic acids of the groups mentioned above, or other carbohydrates either in their genuine form or already partly changed by esterification or etherification may likewise be used.

What we claim is:—

1. The process which comprises reacting in the absence of water upon a compound selected from the group consisting of polymerized carbohydrates and derivatives thereof with a halide of an acid while withdrawing by physical means, the polymerized carbohydrate ester formed from the influence of the hydrogen halide evolved during the reaction.

2. The process which comprises reacting in the absence of water upon a compound selected from the group consisting of polymerized carbohydrates and derivatives thereof with a halide of an acid while sucking off the hydrogen halide evolved during the reaction.

3. The process which comprises reacting in the absence of water upon a compound selected from the group consisting of polymerized carbohydrates and derivatives thereof with a halide of an acid while removing the hydrogen halide evolved during the reaction by a current of an inert gas.

4. The process which comprises reacting in the absence of water upon a cellulose acetate containing still a free OH-group with a halide of an acid while withdrawing, by physical means, the mixed cellulose ester formed from the influence of the hydrogen halide evolved during the reaction.

5. The process which comprises reacting in the absence of water upon a cellulose acetate containing still a free OH-group with a halide of an acid while sucking off the hydrogen halide evolved during the reaction.

6. The process which comprises reacting in the absence of water upon a cellulose acetate containing still a free OH-group with a halide of an acid while removing the hydrogen halide evolved during the reaction by a current of an inert gas.

7. The process which comprises reacting in the absence of water upon a cellulose acetate containing still a free OH-group with a halide of an inorganic acid while withdrawing, by physical means, the mixed cellulose ester formed from the influence of the hydrogen halide evolved during the reaction.

8. The process which comprises reacting in the absence of water upon a cellulose acetate containing still a free OH-group with a halide of an inorganic acid while sucking off the hydrogen halide evolved during the reaction.

9. The process which comprises reacting in the absence of water upon a cellulose acetate containing still a free OH-group with a halide of an inorganic acid while removing the hydrogen halide evolved during the reaction by a current of an inert gas.

10. The process which comprises reacting in the absence of water upon dry cellulose acetate containing still a free OH-group with carbonyl chloride at ordinary temperature under a diminished pressure.

11. The process which comprises reacting in the absence of water upon dry cellulose acetate containing still a free OH-group with chromyl chloride at ordinary temperature under a diminished pressure.

12. The process which comprises reacting in the absence of water upon dry cellulose acetate containing still a free OH-group with butyric acid and thionyl chloride at ordinary temperature under a diminished pressure.

13. The mixed cellulose esters containing the radicle of acetic acid and a radicle of an inorganic acid of the group consisting of carbonic acid, chromic acid and sulfurous acid.

14. Cellulose acetate carbonate absorbing a greater amount of water than cellulose acetate and showing an enhanced capacity of being dyed.

15. Cellulose acetate-chromate, being soluble in acetone and forming transparent, nearly colorless films.

16. Cellulose acetate butyrate sulfite, being insoluble in acetone, but swollen by this solvent, and becoming soluble in the latter when boiled with dilute sulfuric acid.

MAX HAGEDORN.
BERTHOLD REYLE.